United States Patent
Marsh et al.

(10) Patent No.: US 12,407,535 B2
(45) Date of Patent: Sep. 2, 2025

(54) METHOD AND SYSTEM FOR MANAGING DIGITAL, ELECTRONIC COMMUNICATION

(71) Applicant: O Mail AB, Stockholm (SE)

(72) Inventors: Joel Marsh, Stockholm (SE); Tushar Goswami, Punjab (IN); Reuben Rodrigues, Goa (IN); Ranadip Saha, West Bengal (IN); Prasanth Mohan, Kerala (IN)

(73) Assignee: O Mail AB, Stockholm (SE)

( * ) Notice: Subject to any disclaimer, the term of this patent is extended or adjusted under 35 U.S.C. 154(b) by 199 days.

(21) Appl. No.: 18/260,481

(22) PCT Filed: Jan. 15, 2022

(86) PCT No.: PCT/EP2022/050124
§ 371 (c)(1),
(2) Date: Jul. 6, 2023

(87) PCT Pub. No.: WO2022/148765
PCT Pub. Date: Jul. 14, 2022

(65) Prior Publication Data
US 2024/0146552 A1    May 2, 2024

(51) Int. Cl.
*H04L 9/00* (2022.01)
*G06F 16/27* (2019.01)

(52) U.S. Cl.
CPC ............... *H04L 9/50* (2022.05); *G06F 16/27* (2019.01)

(58) Field of Classification Search
CPC .................. H04L 9/50; G06F 16/27
See application file for complete search history.

(56) References Cited

U.S. PATENT DOCUMENTS

| | | |
|---|---|---|
| 10,887,301 B1 | 1/2021 | Vera et al. |
| 2018/0285839 A1 | 10/2018 | Yang et al. |

(Continued)

FOREIGN PATENT DOCUMENTS

| | | |
|---|---|---|
| EP | 3468095 A1 | 4/2019 |
| JP | 2019036032 A1 | 3/2019 |
| WO | 2019152750 A1 | 8/2019 |

OTHER PUBLICATIONS

International Search Report & Written Opinion dated Mar. 18, 2022, European Patent Office, Rijswijk, Netherlands.

(Continued)

*Primary Examiner* — Clayton R Williams
(74) *Attorney, Agent, or Firm* — Noréns Patentbyrå AB

(57) ABSTRACT

Method for managing digital, electronic communication, comprising the steps
a) providing a main blockchain (100);
b) providing a first token (101), cryptographically tied to said main blockchain;
c) a user (U1) granting the first software access to a user account (401) of a first communication service (400),
d) the user taking an alpha communication action (A) in said first communication service;
e) said first software reading said alpha communication action and creating an alpha blockchain transaction (201) on a first blockchain (200) initiated based on said first token, said transaction comprising metadata (201*a*) regarding the alpha communication action;
f) incorporating said transaction in the first blockchain;
g) a central server (500) reading said transaction;
h) the user taking a beta communication action (B) in said first communication service; and
i) the server providing priority information (BI) regarding the beta communication action based on the transaction.

(Continued)

The invention also relates to a system.

15 Claims, 5 Drawing Sheets

(56) References Cited

U.S. PATENT DOCUMENTS

| | | |
|---|---|---|
| 2019/0179672 A1 | 6/2019 | Christidis et al. |
| 2019/0182254 A1 | 6/2019 | Christidis et al. |
| 2019/0325532 A1 | 10/2019 | Torrenegra et al. |
| 2020/0211054 A1 | 7/2020 | Garg et al. |
| 2020/0296082 A1* | 9/2020 | Killoran, Jr. ........ H04L 61/4511 |
| 2022/0005053 A1* | 1/2022 | Gurugubelli ....... G06Q 30/0269 |

OTHER PUBLICATIONS

Second Written Opinion dated Nov. 29, 2022, European Patent Office, Münich, Germany.

T. Cai et al., "Analysis of blockchain System with token-based bookkeeping method", in IEEE Access, vol. 7 pp. 50826-50832, 2019, doi:10.1109/ACCESS.2019.2911124.; whole document.

Notice with search report dated Sep. 10, 2021, Swedish Patent and Registration Office, Stockholm, Sweden.

* cited by examiner

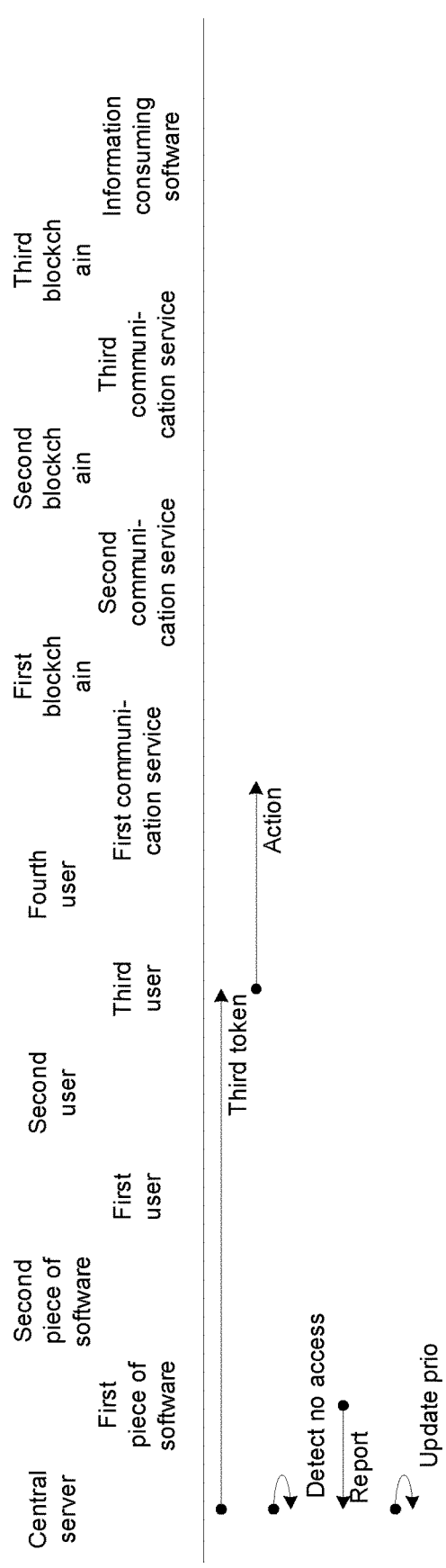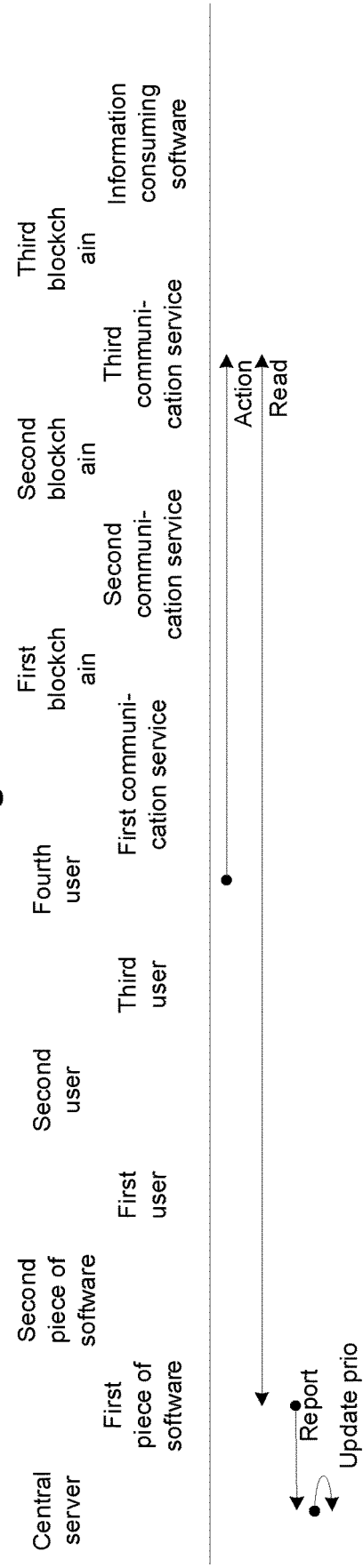

METHOD AND SYSTEM FOR MANAGING DIGITAL, ELECTRONIC COMMUNICATION

The present invention relates to a method and a system for managing digital, electronic communication, such as e-mail, chat messages or social media communication between a different users.

There have been many attempts to manage such communication with the purpose of providing users with an updated yet relevant state of a particular communication flow. Users of digital communication systems often receive large numbers of messages from other users wherein only a subset of the received messages may be of particular relevance to the receiving user.

For instance, in e-mail systems it is known to prioritize certain messages over other messages, based on set rules pertaining to known information regarding the sender, message contents, receiving user topics of interest, and so forth. Then, e-mail messages perceived as relatively important can be displayed at the top of a list of received e-mails.

As another example, in social media it is known to use likes, upvotes, shares and similar to filter out relatively important messages or posts as those with which user interaction has been particularly intense. Similarly, users with many followers are regularly seen as more relevant than users with fewer followers, and as a result their posts may be prioritized in different media flows.

Despite these and other efforts, digital communication remains unnecessarily burdensome for users. The global spam industry continues to operate on a massive scale, and many users of e-mail and other digital communication systems will recognize that such use frequently involves receiving many unwanted messages even if such unwanted messages cannot be categorized as "spam" per se. Social media users may convince large amounts of other users to follow them, and as a result gain in perceived relevance.

The handling of unwanted communication of course is time consuming for users. It may also shift the focus of a receiving or consuming user away from productive work.

Therefore, it would be desired for such digital communication systems to automatically be able to discern how relevant a particular message or post is to the receiving or consuming user, so that more relevant information can be prioritized for processing in such systems while less relevant information can be down-prioritized or even automatically discarded so that the receiving user does not have to spend time consuming or processing such information.

However, existing infrastructure for digital communication is both vast and exceedingly complex. For each type of digital communication, there are numerous providers of communication systems and services, and different users typically do not use the same vendor. It is therefore a challenge to provide a solution that works in a general enough manner so that users can benefit from such message prioritisation cross-platform, independently of what vendor is used by the communication counterpart and so forth.

Also, such a solution should not be easily manipulated by users. For instance, in social media there are numerous examples wherein it has proven possible to manipulate the priority algorithms used to regulate the message flow of a particular user, such as by using farms of fake accounts and so forth. In e-mail it is possible to send massive amounts of spam e-mails and to hope that at least some of the recipients will react in the intended way. Even if one such recipient flags the sender as a spammer, this does not automatically mean that other users will recognise this. The sender can also simply change the sending address to overcome many such mechanisms.

A further problem relates to trust. The user of a centralized message prioritisation system may be kept in the dark regarding non-prioritized messages and the reason why some messages are not prioritized. This may lead to poor trust from such users, in turn leading to them not using the system. If the underlying information flow is publicly published, however, it may on the other hand become possible to come up with creative ways of manipulating the system based on such information. Message contents itself may also be sensitive and not suitable for publication.

Moreover, it would be desirable for such a method and system to be resilient to various hacking attacks.

US 2019/325532 A1 discloses a system for managing interest signals and recommendations between users of the system. Signals and recommendations are prioritized according to a frequency and quality of such signals and recommendations sent within the system.

WO 2019/152750 A1 discloses a system for implementing a user community with consent management, using sidechains, distributed ledgers and a cloud-based computing environment.

The present invention solves the above described problems.

Hence, the invention relates to a method for managing digital, electronic communication, comprising the steps, performed before a first point in time, of a) providing or identifying a main blockchain; b) providing a first main token, cryptographically tied to said main blockchain; and c) a first user granting the first piece of software access to a first user account of a first digital, electronic communication service, wherein the method further comprises the steps, performed after said first point in time, of d) the first user taking an alpha communication action in said first communication service; e) said first piece of software automatically reading said alpha communication action, using said granted access, and as a result automatically creating an alpha blockchain transaction on a first blockchain, the first blockchain being initiated based on said first main token, said alpha blockchain transaction comprising or being associated with specific metadata regarding the alpha communication action; f) incorporating said alpha blockchain transaction in the first blockchain and a central server reading said alpha blockchain transaction; g) the first user taking a beta communication action in said first communication service or in a second digital, electronic communication service; and h) the central server providing priority information regarding the beta communication action based on the alpha blockchain transaction.

Moreover, the invention relates to a system for managing digital, electronic communication, said system comprising a central server and a first piece of software, the system being arranged to provide or identify a main blockchain and a first main token, cryptographically tied to said main blockchain, the first piece of software being arranged to accept an access grant to a first user account of a first, digital communication service, and to automatically read, using said access grant, an alpha communication action performed by a first user in said first communication service, and as a result automatically create an alpha blockchain transaction on a first blockchain, the first blockchain being initiated based on said first main token, said alpha blockchain transaction comprising or being associated with specific metadata regarding the alpha communication action, in that the first piece of software is further arranged to incorporate said alpha blockchain transaction in the first blockchain, the central server being arranged to read said alpha blockchain transaction and to provide priority information regarding a beta communication action, taken by a first user in said first communication service or in a second digital, electronic communication service, based on the alpha blockchain transaction.

In the following, the invention will be described in detail, with reference to exemplifying embodiments of the invention and to the enclosed drawings, wherein:

FIGS. 3a-3d are respective sequence diagrams illustrating various aspects of a method according to the present invention;

FIG. 1 is an overview of a system according to the present invention, the system being a system for managing digital, electronic communication, and further being specifically adapted for performing a method according to the present invention.

The system at least comprises a central server 500. This server 500 is "central" in the sense that a predetermined set of functionality of the server 500 can be reached by other actors in a well-defined logical location, such as using a well-defined internet address. The server 500 itself may encompass different functionality, implemented in software executing on one or several hardware platforms, as a stand-alone server or in a distributed environment. For instance, the server 500 functionality may be provided by software executing in a virtual environment, on the virtually emulated hardware of one or several servers. The functionality of the server 500 may also be massively distributed, such as based on a large number of cooperating and intercommunicating peers. Such system topologies are well-known as such, and will not be detailed further herein.

The central server 500 also comprises a data storage, which may be implemented in any of the above described system architectures.

Figure 1:
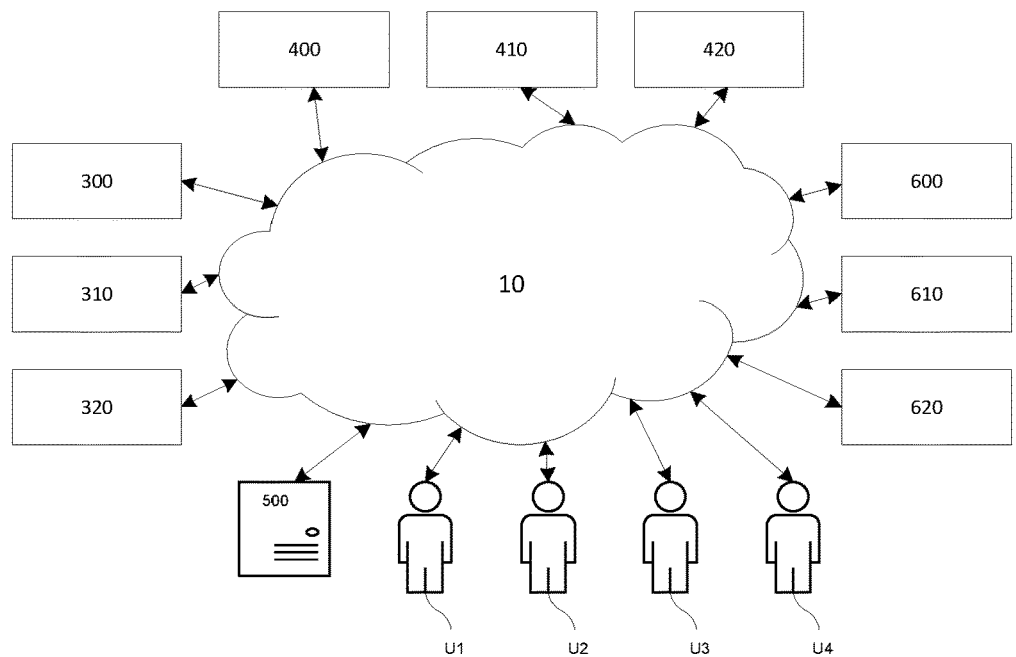
FIG. 1 is an overview of a system according to the present invention.

Hence, even though FIG. 1 shows the central server 500 as one monolithic server, what is important is that the central server 500 represents a set of functionality and data storage which can be logically accessed by other actors in a well-defined manner.

The system also comprises at least one piece of software 300. FIG. 1 also shows a second piece of software 310 and a third piece of software 320. It is understood that the system, depending on configuration, may comprise many such pieces of software, such as at least one for each user and/or at least one for each communication service (see below). Several such pieces of software may then be different or identical copies, arranged to execute on suitable hardware. For instance, some or all of said pieces of software may form part of the central server 500. Below, the functionality provided by said pieces of software 300, 310, 320 will be elaborated in detail.

In FIG. 1 there is also shown a first digital, electronic communication service 400, a second such digital communication service 410 and a third such digital communication service 420. The system may be arranged to interact with one or several, preferably at least ten, different such communication services.

Each of said communication services 400, 410, 420 is represented by a respective API (Application Programming Interface), allowing it to accept requests and to deliver responses to such requests. The communication services 400, 410, 420 may each be of any suitable type, but will typically be configured to deliver communication services for communications between different users, preferably of users to the present system. Such communications may be one-to-one messages, many-to-many messages, one-to-many posts, and so forth, and are digital in the sense that they are in the form of digitally coded data being communicated electronically from one or many users to one or many users. The communication services 400, 410, 420 are preferably open, in the sense that any user that so desires can create a user account and start using the service in question for communicating. Such communication use may take part over said API; using a custom software application; using a web site provided by the communication service; and so forth.

In some embodiments, each of said communication services 400, 410, 420 is individually selected from the group containing an e-mail providing service or other service for providing communications in the form of digital, electronic messages communicated using a predetermined communication protocol; a social media platform allowing users to digitally, electronically follow or request follows from other social media users; a system for digitally, electronically share or post pieces of information; and a system for allowing users to digitally, electronically invite other users to participate in a particular defined digital context, such as to view, edit and/or distribute particular digital information.

Concretely, each of the communication services 400, 410, 420 may be an e-mail service provider, a social media platform or a direct messaging platform.

FIG. 1 also shows a first information consuming piece of software 600, a second information consuming piece of software 610 and a third information consuming piece of software 630. One or several of such information consuming pieces of software 600, 610, 620 may form part of the system or be arranged externally to the system.

As it is used herein, the term "information consuming piece of software" refers to a system or subsystem arranged to allow a user to electronically consume digitally coded information using a suitable interface. The consumed information may be any digital information, but is preferably at least partly information communicated between users using one or several of said communication services 400, 410, 420. The interface may be a user interface, such as a GUI (Graphical User Interface), in particular an interactive GUI. For instance, the interface may be provided on a computer screen of a computer or a mobile device.

To be more concrete, each such information consuming piece of software 600, 610, 620 may be a communication-displaying and/or communication-management software function, for instance arranged to be used as a communication interface to a user, in particular configured to allow the user in question to view communications partaken between the user in question and other users, via one or several of said communication services 400, 410, 420. For instance, each of said information consuming pieces of software 600, 610, 620 may be an e-mail reader, a social media client or a direct messaging client.

It is noted, however, that each of said information consuming pieces of software 600, 610, 620 may also be or comprise a machine-to-machine interface, such as a secondary e-mail server.

FIG. 1 also shows a first user U1, a second user U2, a third user U3 and a fourth user U4. Each of said users U1-U4 is shown as a person, for reasons of simplicity. However, it is realized that each of said users U1-U4 uses some kind of electronic device, such as a respective stationary computer, laptop, mobile phone or tablet computer, to interact with the system and the other actors illustrated in FIG. 1. Each user U1-U4 may be identified in the system using a unique user identity. Each user U1-U4 may further be associated with one or several user addresses, usernames or user identities for use in the different communication services 400, 410, 420. Hence, each user U1-U4 may have user accounts in one or more than one of said communication services 400, 410, 420, but each user U1-U4 is preferably uniquely identified as one single user in the system.

Hence, all the actors illustrated in FIG. 1 are electronic devices, arranged to communicate one with the others using a common communication network 10, such as the internet. All communications are electronic and digital, and if nothing else is stated all interactions taking part between these actors and described herein take part using respective software executing on suitable hardware. Everything which is described herein is furthermore performed automatically, unless otherwise stated or if apparently not plausible.

Figure 2:
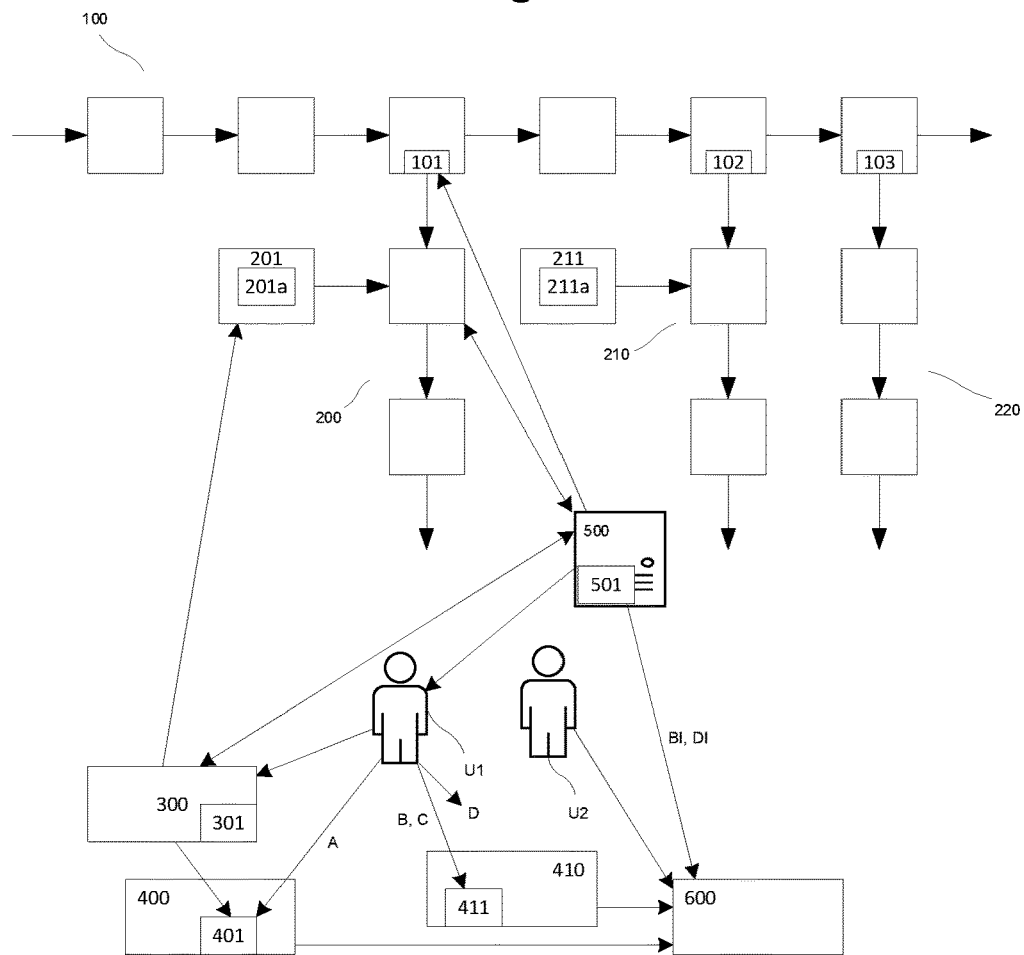
FIG. 2 illustrates various communication links between different actors in said system.
Figure 3A:
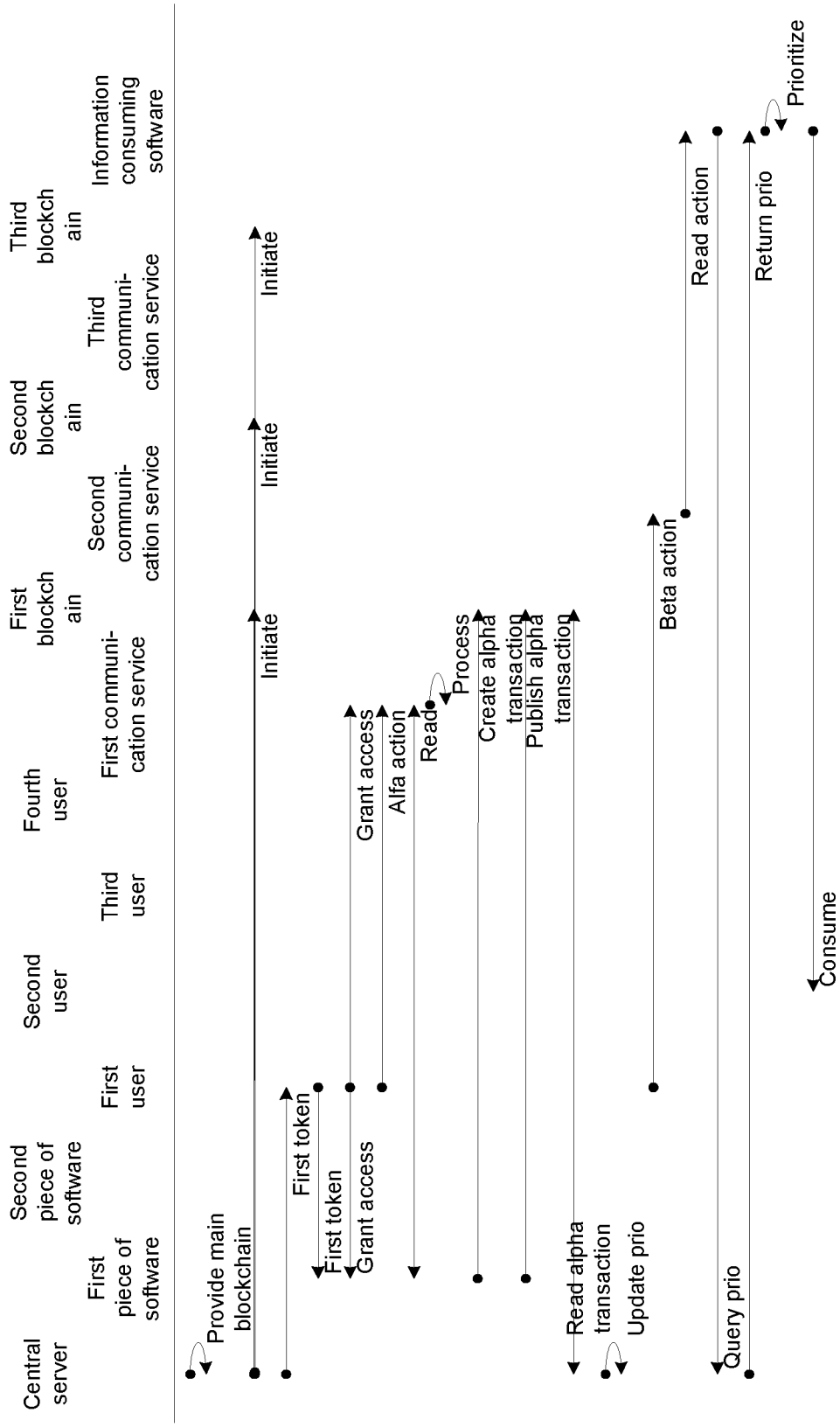
Figure 3D:
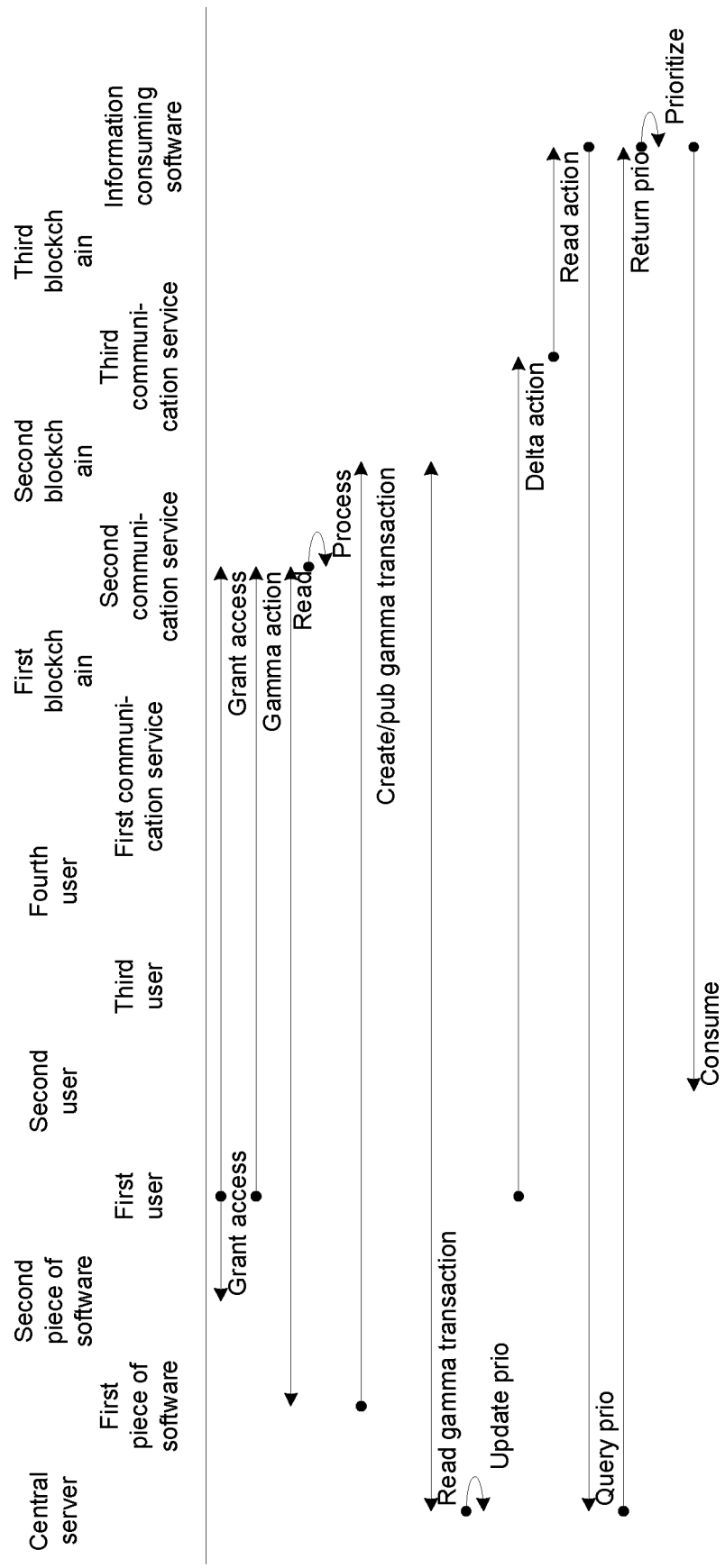
Figure 4:
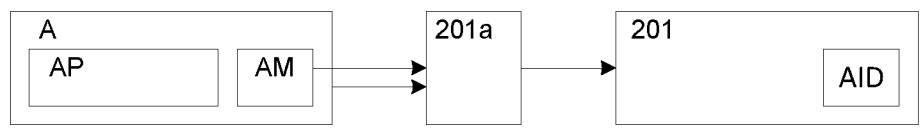
FIG. 4 illustrates data structures used in said method and by said system.
Figure 4:
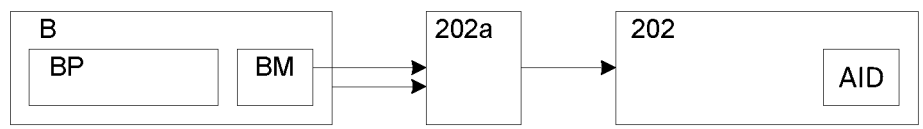
Figure 4:
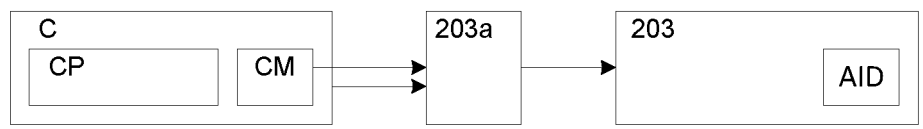

FIGS. 2-4 illustrate, from different perspectives, a method according to the present invention, for managing digital, electronic communication. The method is generally performed by a system according to the present invention. FIG. 2 highlights (not exhaustively) a number of functional interrelationships between different parts (actors) of the present system. FIGS. 3a-3d are respective sequence diagrams together illustrating an example of a method according to the present invention. FIG. 4 shows two examples of a data structure used in the present method.

It is to be noted that FIGS. 2-4 illustrate the present method in relative high detail, and encompass various possible detailed aspects of the present method. All such detailed aspects are generally applicable to the present system, but it is realized that everything that is described in connection to FIGS. 2-4 and illustrated therein is not a necessary part of the present invention. Instead, these FIGS. 2-4 should be considered to illustrate a number of possible and exemplifying embodiments of the present invention while at the same time illustrating the technical principles underpinning the invention.

Turning to FIGS. 2 and 3a, in a first method step a main blockchain 100 is provided or identified, meaning that a main blockchain is initiated (such as by mining a first block of the main blockchain or cryptographically sealing the first block without mining, as the case may be), or, in case the main blockchain 100 already has been initiated before, it is identified. Such identification may be, for instance, that it is referenced from memory. Preferably, there is only one main blockchain 100 used for all sub-blockchains used by the present system (see below), even if it is possible to use several independent or inter-dependent main blockchains. At any rate, for one used main blockchain 100 there should be more than one sub-blockchains of the below-described type.

The main blockchain 100 may be a custom blockchain, initiated from scratch or based on any publicly verifiable blockchain (such as the Bitcoin or Etherium blockchains), or even be such an already-existing publicly verifiable blockchain. Hence, the internal functioning of the main blockchain 100, such as how blocks are formed (such as mined), used consensus algorithms (if any), and so forth, may vary.

Preferably, it is the central server 500 that does the providing and/or identification in question, as is illustrated by way of example in FIG. 3a.

In some embodiments, the main blockchain 100 is controlled by the central server 500. The central server 500 may add information to the main blockchain 100, such as by adding new blockchain transactions, and possibly also close blocks, on the main blockchain 100. For instance, the central server 500 may sign transactions and/or blocks on the main blockchain 100 using a private key in a PKI public/private key pair, said private key being known only to the central server 500. In some embodiments, the central server 500 is the only party being able to add new information to the main blockchain 100, for instance due to it having been initiated by the central server 500 and the definition of the main blockchain 100 being such that only transactions and/or blocks signed by said private key (verifiably corresponding to said public key) are allowed in relation to the main blockchain 100.

The main blockchain 100 may be a permissioned blockchain, for instance implemented using HyperLedger or similar platform. The central server 500 may have write access to the main blockchain 100 whereas some or all of the users U1-U4, such as all users that have been awarded a main token (see below), may have read access to the main blockchain 100. Each main token may be only provided to the user to which it pertains, and the corresponding sub-blockchain blockchain may then be accessed only using the main token in question.

In a subsequent step, a first main token 101 is provided, which first main token is cryptographically tied to said main blockchain 100. The first main token 101 may be provided to said first piece of software 300, such as from the central server 500. That this first main token 101 is "cryptographically tied" to the main blockchain 100 means that the first main token 101 is determined or calculated based on information contained in the main blockchain 100 in a way making it mathematically impossible to, in reasonable time, determine a value of the first main token 101 without knowledge of said information. This may be accomplished using one-way functions, such as is conventional as such. What is important is that the first main token 101, being cryptographically tied to the main blockchain 100, can be used to initiate a sub-blockchain (the first blockchain 200, see below) in a way tying the sub-blockchain in question to the main blockchain 100 in a cryptographically secure way. The first main token 101 itself may be a numerical value or other piece of information which may be easily communicated over the network 10, but that contains sufficient information so as to be not easily guessed.

In some embodiments, the first main token 101 is determined or calculated, by the central server 100, and/or provided by the central 100 to the first user U1. The first user U1 may, in some embodiments, provide the first main token 101 to the first piece of software 300. Alternatively, the central server 100 may provide the first main token 101 directly to the first piece of software 300.

It is generally preferred that the first user U1 is associated with the first piece of software 300, in the sense that the first user U1 initiates the first piece of software 300 so that it can access the first user account 401 and/or that the first user U1 has a user account with the first piece of software 300 and/or can establish a secure communication, such as an encrypted communication link, with said first piece of software 300. It is also preferred that the user U1 can communicate with, and/or control, the first piece of software 300 without any other user U2-U4 being able to eavesdrop such communications, such as using conventional encryption. Furthermore, it is preferred that the central server 500, or at least parts of the central server 500 not forming part of the first piece of software 300, is logically separate from the first piece of software 300 in a way preventing such part of the central server 500 from eavesdropping such communications.

Hence, by the first user U1 being provided with the first main token 101 and subsequently providing the first main token 101 to the first piece of software 300, or alternatively that the central server 500 provides the first main token to the first piece of software 300, no other actor in the present system gains access to the first main token 101, and in particular no other users U2-U4 of the system.

The first main token 101 may be private and personal to the first user U1. This may imply that the first main token 101 in itself constitutes proof of membership for the first user U1 with the present system, and may be awarded to the first user U1, via a safe communication channel of the above discussed type, as a part of a sign-up process of the first user U1.

It is realized that what has been said here regarding the first main token 101 in relation to the first user U1 may be correspondingly true regarding the relationship between other main tokens and other corresponding users.

Furthermore according to the present invention, the first user U1 grants the first piece of software 300 access to a first user account 401 of the first communication service 400. Hence, the first user U1 is a user of the first communication service 400, via a login or other type of account 401 with the first communication service 400, and the first user U1 provides also the first piece of software 300 access to said first user account 401. This may imply that the first user U1 simply provides the first piece of software with login credentials to the first communication service 400. What is important is that the first piece of software 300 is granted read rights to the first communication service 400 with respect to communications pertaining to the first user U1, such as messages sent or posted by, from, to or in relation to the first user U1 within the first communication service 400. After the first piece of software 300 has been provided such access, it can automatically and autonomously log in or otherwise access said first user account 401 to read such communications, without the participation of the first user U1.

The first piece of software 300 may be arranged to verify the first main token 101 received by the first user U1 or the central server 500, and in case the verification turns out in the negative the method may end (otherwise proceed as described). The verification may be in relation to the main blockchain 100, such as using a PKI verification as is well-known in the art. For instance, the first piece of software 300 may use the published public key of the central server 500 to verify that the first main token 101 was produced or signed by the holder (the central server 500) of the corresponding private key.

Hence, the central server 500 holds a private key using which the first main token 101 is initiated by the central server 500. The corresponding may be true regarding all such main tokens 102, 103. In this case, the first piece of software 300 may use a corresponding public key (that may be published by the central server 500 or another entity) to verify the first main token 101 in said manner.

In some embodiments, the first main token 101 is calculated based on at least an address of the first user U1, said address being a communication address using which the first user U1 is accessed or referenced in the first communication service 400, such as an identifier of said user account 401. For instance, the address may be an e-mail address, a social media username and so forth, correspondingly. The first main token 101 may furthermore be calculated based on additional information, such as a current-time timestamp at token creation and a nonce value. For instance, the first main token may be calculated as follows:

Hash("john.doe@email.com"+"2009-10-31T01:48:52Z (ISO 8601)"+"uwosjdb926372761"), wherein the first text string part is said address, the second text string part is said timestamp and the third text string part is said nonce value.

By calculating the first main token based on said first user U1 address, the address in question is cryptographically tied to the main token and vice versa. By providing the first main token 101 to a querying party, the first user U1 can prove to the querying party that the first main token 101 is authentic, using knowledge about said address and any other information used to calculated the first main token 101, as well as the public key of the central server 500.

The initiation of the first piece of software 300, so that it can access the account 401, may take place by the first user U1 instructing the first communication service 400 to issue an access token to the first piece of software 300, such as using an Oath protocol. For instance, the first piece of software 300 may comprise a user interface, such as web page, implementing functionality for requesting such an access token from the first communication service 400, arranged to allow the first user U1 to allow such access by simply indicating acceptance of such access token issuance, in turn possibly comprising the first user U1 entering first user U1 login credentials to said account 401 in said user interface. This type of access token creation is well-known per se, and is widely used by communication service providers such as Google® to provide third-parties access to such accounts on behalf of individual users.

Once the first piece of software 300 has been provided with such an access token, it can subsequently use the access token in question to access and read information from said account 401.

The above method steps may be performed at a first point in time, as part of an initiation or configuration phase of the present method. Once said access has been provided, the system is configured to track and process communications with respect to the first user U1 in the first communication service 400, via said account 401.

Then, at a later point in time, the first user U1 takes an alpha communication action A in said first communication service 400.

As used herein, a "communication action" is an active event initiated by the user in question in relation to the communication service in question. It may, for instance, be a command sent to the communication service from the user, or an event triggered by the user using a control in a GUI of the communication service. It generally results in a communication event occurring, such as a digital message being sent or posted in or by the communication service. Furthermore, such a communication action is generally in relation to the user in question, meaning that the triggered event directly involves the user in question as a sender, poster or in some other capacity of the communication in question.

One simple example is that the first user U1 presses the "send" button in an email client, triggering a send action in the mail server (the first communication service) of the email, with the first user U1 as "sender" in the email.

Then, the first piece of software 300 automatically reads said alpha communication action A, preferably in the first communication service 400. This reading is performed using the above-discussed granted access to the first communication service 400 account 401, such as using said access token. For instance, the first piece of software 300 may be logged-in to the first communication service 400 and therefore being capable of querying the first communication service 400 for any events pertaining to the first user U1, and/or the first piece of software 300 may subscribe to communication events pertaining to the first user U1 with the first communication service 400 so that a push alert is received by the first piece of software 300 anytime such a communication action is triggered. It is noted that this reading by the first piece of software 300 preferably takes place without the first user U1 having to notice anything or be involved in any way in the reading as such. In particular, the reading may take place using a parallel communication channel with respect to a communication channel between an email client software, or other information consuming software used by the first user U1, and the first communication service 400. The reading may take place without involving an information consuming software (the term "information consuming software" here being interpreted in the sense of the present description) in any way, in a completely parallel flow. In some embodiments, the reading may also be an intercepting, performed by the first piece of software 300, of a result of the alpha communication action A, using said granted access to the account 401.

As a result of said reading, the first piece of software 300 is arranged to then automatically create or define an alpha blockchain transaction 201 on a first blockchain 200 (see FIG. 2). This first blockchain 200 is a blockchain being initiated based on said first main token 101, and is therefore cryptographically tied to the main blockchain 100. The alpha blockchain transaction 201 in turn is defined by the first piece of software 300 to comprise or to be cryptographically associated with specific metadata 201a regarding the alpha communication action A.

For instance, this metadata 201a may specify (in plaintext, coded form and/or via associations to external data) one or several senders, one or several recipients, a communication action type, a communication service used, a timestamp, and so forth, this information being specific to the alpha communication action A. The metadata 201a may form an integrated part of the alpha blockchain transaction 201, such as in a payload of the alpha blockchain transaction 201, or may be cryptographically tied to the alpha blockchain transaction 201 using one-way functions as is entirely conventional as such. For instance, the per-se well-known mechanism of "blockchain colouring" may be used. In a simple example, the alpha blockchain transaction 201 may comprise or be calculated based on a one-way function digest of the metadata 201a, making it possible to, at a later point in time, prove that the alpha blockchain transaction 201 was calculated based on the metadata 201a.

Preferably, there is one unique such sub-blockchain 200, 210, 220 for each main token 101, 102, 103. This may mean that there is one unique such sub-blockchain for each user U1-U4 account with the present system (such as with the central server 500), or even one unique such sub-blockchain for each combination of user and communication service 400, 410, 420. In preferred embodiments, each main token 101, 102, 103 is calculated based on an address as described above, in which case there is one unique such sub-blockchain for each such address (at least for each such address that has been used in a way captured by the corresponding piece of software). It is realized that such an address is typically associated with exactly one communication service 400, 410, 420.

Hence, each sub-blockchain 200, 210, 220 is then limited to record metadata regarding communication actions taken by one single user, by one single user using one single communication service and/or one particular such address (such as an e-mail address). This provides the highest security and most efficient implementation. However, in some embodiments one and the same sub-blockchain 200, 210, 220 may be used to record information regarding communication actions for several different communication services, and/or for several different users and/or for several addresses.

Each sub-blockchain may be initiated at the registration of the corresponding user or address with the central server 500, or at the capturing of the first communication action taken in relation to the user or the address, as the case may be. That the sub-blockchain is "initiated" means that a first transaction or block is defined, forming the first transaction or block of the sub-blockchain. It is preferred that this first transaction or block is calculated based on the main token associated with the sub-blockchain in question, such as using a one-way function such as a hash function, making it possible to prove that the main token, that is calculated based on information contained in the main blockchain 100, was used to initiate the sub-blockchain. This provides a convenient way for the user in question to know for sure that information registered on the sub-blockchain in question, used to register communication actions as described herein, originates from the main blockchain 100. In the preferred case in which the central server 500 cryptographically signs both the main token in question and the first transaction or block of the sub-blockchain in question, using the central server's 500 private key, it is possible for the user in question, but also for any other user that the user in question chooses to give sufficient information to, to verify the accuracy of this cryptographic chain of information.

Thereafter, the created alpha blockchain transaction 201 is incorporated in the first blockchain 200. This incorporating may involve the incorporating of the alpha blockchain transaction 201 into a block on the first blockchain 200, which block may then be mined in a per-se conventional manner, or simply be cryptographically sealed without mining, depending on what type of blockchain is used as the first blockchain 200. It is preferred that the secondary blockchains 200, 210, 220 are not mined, but that new transactions are instead put into blocks on the blockchain in question by the central server 500. This may then be preceded by the central server 500 verifying that the piece of software 300 that created the transaction in question is indeed authorised to do so. This may, for instance, take place by the central server 500 verifying that the alpha transaction 201 was signed using a private key corresponding to a public key which is known by the central server 500 to correspond to the piece of software 300 in question.

Hence, the alpha blockchain transaction 201, after this publication, is cryptographically tied to the first blockchain 200 in an immutable way. That the alpha blockchain transaction 201 is "incorporated" may also mean that information sufficient to read and cryptographically verify the transaction in question is at least made available for reading by the central server 500, in some cases for any user of the system (such as users that have been rewarded with a personal token of the above-described type), or even for any actor. Each sub-blockchain may be a permissioned, such that its contents are only readable by permitted actors. For instance, each sub-blockchain may be readable by the central server 500 and the user in relation to whom the corresponding main token has been issued. Then, that user may choose to provide other users with information sufficient to cryptographically verify the veracity and provenance of the communication actions registered on the sub-blockchain in question. The provision of such permissioned blockchains is conventional as such, and can be implemented for instance using the HyperLedger fabric.

In preferred embodiments, the alpha blockchain transaction 201 is defined by the first piece of software 300 and signed by the first piece of software 300 using a private PKI key of the first piece of software 300 in question. Then, the alpha blockchain transaction 201 is provided, such as by the alpha blockchain transaction 201, to the central server 500, that further signs the alpha blockchain transaction 201 using the central server's 50 private PKI key. Thereafter the alpha blockchain transaction 201 is incorporated in the first blockchain 200. Then, anyone with knowledge of the respective public PKI keys corresponding to said private keys may verify that both the first piece of software 300 and the central server 500 have approved of the incorporated alpha blockchain transaction 201.

In some embodiments, the first piece of software 300 may be provided with its PKI key pair by the central server 500, after which the central server 500 erases the private PKI key from its memory, or the first piece of software 300 may calculate the PKI key pair itself and then only expose the public key outside of the first piece of software 300. This way, the private key of the first piece of software 300 is unavailable to anyone apart from the piece of software 300 itself, so that the piece of software 300 is cryptographically self-locked.

So, the central server 500 may create the first piece of software 300, comprising said private key and the first main token 101. Then, it can allow the first user U1 to login to the first communication service 400 via the user interface of the first piece of software 300 in the way described above, so that the first piece of software 300 is provide with the access token to the first communication service 400. This makes it possible for the first piece of software 300 to, automatically and autonomously, monitor the activity on the first user account 401 and to create and sign blockchain transactions corresponding to any captured communication actions, and to send them to the central server 500 for signing and incorporation in the first blockchain 200. The central server 500 can (and may) verify that the signature provided by the first piece of software 300 is valid, using the public key of the first piece of software 300. Access to the first piece of software 300 may furthermore be encrypted, by the central server 500, using the private key of the first piece of software 300 and prior to the central server 500 erasing the private key in question. After this, the first piece of software 300 is arranged to only listen to logins using the first user's first user account 401 credentials, that are only known to the first user U1.

Thereafter, the central server 500 reads said incorporated alpha blockchain transaction 201. In case the central server 500 receives the alpha blockchain transaction 201 from the first piece of software 300, the central server 500, this may constitute said reading. However, in this and in other cases, the reading may take place immediately or later from the first blockchain 200.

In particular, the central server 500 may read and interpret said metadata 201*a*, and as a result gain transaction-specific information regarding the alpha communication action A to which the metadata 201*a* pertains. The central server 500 may infer, from the fact that the alpha blockchain transaction 201 is incorporated in the first blockchain 200, in contrast to any other secondary blockchain, or using said metadata 201*a*, the identity of the initiator of the alpha communication action A.

The alpha blockchain transaction 201 (or a reference to the alpha blockchain transaction 201) may also be copied to (incorporated in) each respective sub-blockchain corresponding to other users or user accounts (addresses) to which the alpha communication action A pertains, apart from the first user. This copying may take place in any suitable way, such as administered by the central server 500. Hence, for each communication action taking place between registered users of the system, there may be one corresponding blockchain transaction incorporated in the respective sub-blockchain of each of the users involved in the communication action in question.

The central server 500 may have knowledge about the first blockchain 200 and that this first blockchain 200 contains information regarding metadata pertaining to communication actions taken, and may continuously or intermittently probe the first blockchain 200 for updates. Alternatively, a callback mechanism may be used, whereupon the central server 500 is notified when the first blockchain 200 is updated.

It is hence understood that this reading of the alpha blockchain transaction 201 can take place immediately or with a certain delay, depending on the configuration of the central server 500 in relation to the first piece of software 300 and to the first blockchain 200.

Apart from the central server 500 reading the first blockchain 200, the alpha communication action A itself is processed by the first communication service 400. This involves, for instance, sending the email discussed above. This processing may take place before or after said reading by the first piece of software 300 of the communication action. At any rate, it is preferred that this processing takes place independently of the definition and incorporating of said alpha blockchain transaction 201, so that this blockchain incorporating takes place as a direct result of the initiation of the alpha communication action A but not necessarily in any particular time order. It is also preferred that the processing takes place in the conventional manner for the particular type of communication action A in question, in other words in a manner being the normal one for the first communication service 400 to process actions of the general alpha communication action A type.

Thereafter, the first user U1 takes a beta communication action B. This beta communication action B may be of the general type discussed in relation to the alpha communication action A, but the alpha and beta actions can be of different types. For instance, if the alpha communication action A is the first user U1 sending an email to a particular set of one or several recipients, the beta communication action B may be the first user U1 sending another email to the same or a different set of recipients, or the beta communication action B may be the first user U1 sending a direct chat message to some recipient. In particular, the beta communication action B may be partaken in said first communication service 400 or in a different communication service 410, 420.

In case the first main token 101 is determined based on the particular address of the first user U1 in the first communication service 400 and the beta communication action takes place in relation to a difference address, such as using a different user account in the same or a different communication service, the central server 500 may comprise associative information regarding the different accounts of the first user U1, so that priority information (see below) can be calculated based on several different such accounts belonging to the first user U1. In other cases, the first user U1 may use one and the same first main token 101 to provide user account access to one or several pieces of software, so that one or several corresponding sub-blockchains may be cryptographically linked to one and the same main token, and priority information may be calculated based on all sub-blockchains being associated with the same main token. In yet other cases, priority information is calculated strictly based only on the first user account 401, and then this same user account 401 also used for the beta communication action B.

In other words, priority information may be calculated on user level or on user account (communication service address) level, as the case may be.

Thereafter, the central server 500 provides priority information BI (see FIG. 2) regarding the beta communication action B, which priority information BI is calculated or determined based on the alpha blockchain transaction 201 read by the central server 500 as described above.

Namely, the central server 500 may keep and/or calculate such priority information for each user U1-U4 of the system, where each such user U1-U4 is associated with particular such user-specific priority information. This priority information for a particular user U1-U4 may be updated in relation to blockchain transactions, or metadata associated with blockchain transactions, detected by the central server 500, such as on said sub-blockchains 200, 210, 220 as described above, and that pertain to communication actions involving the user and/or user account in question.

In particular, the priority information for each user U1-U4 may be updated in reaction to the central server's 500 detection of such blockchain transactions or metadata indicating the user in question taking a particular role in such communications. For instance, for communication actions partaken in peer-to-peer messaging communication services, the priority of the user may be updated based on detected metadata according to which the user in question has the role of a "sender" of a message. In another example, in a social media platform the priority of the user may be updated based on detected metadata according to which the user in question "follows" another user or account in that social media platform. In typical cases, the priority of the user may be updated based on detected activity in which the user in question has a role as initiator of communication activities in relation to other users.

Hence, the central server 500 may perform an update of such priority information based on the detection of the transaction 201 and/or the metadata 201a, such as on the first blockchain 200, before or after the first user takes the beta communication action B. However, at the time the central server 500 provides said priority information BI for the first user U1 this update has taken place.

The provision of the priority information BI may be to the first information consuming piece of software 600, which may be used by the second user U2. In particular, the first information consuming piece of software 600 is arranged to allow the second user U2 to consume respective results of several communication actions taken by different users (such as the first user U1). Then, the updated priority information BI may be used by first information consuming piece of software 600 to prioritize between different such communication actions, for instance in an interactive GUI of the software 600, used by the second user U2 to view such communication actions and to interact with other users U1, U3, U4 using communication actions of one or several of the types discussed herein.

Hence, the priority information BI is updated based on the detection of the alpha communication action A, via the mechanism using the first piece of software 300 and the first blockchain 200. Then, the updated priority information BI may be used to affect the behaviour of various systems used to consume the beta communication action B. This way, the system may automatically adapt to detected communication patterns for the first user U1 in relation to other users U2-U4 (and correspondingly for other users U2-U4 in relation to their respective peers). Due to the use of the main 100 and secondary 200, 210, 220 blockchains, the system can be designed to be completely distributed and trustless, in other words with full security and integrity without the users having to trust the central server 500. All blockchain transactions incorporated in secondary blockchains 200, 210, 220 can be cryptographically traced, via respective main tokens 101, 102, 103, back to the main blockchain 100 and hence to one common root origin.

Metadata 201a may be stripped from all potentially sensitive information and encrypted, and the respective payloads of communicated communication actions may be kept entirely out of reach from the system and never used. Hence, even if all data in the used blockchains 200, 210, 220, 230 is publicly available, full integrity and data security can be maintained for all system users U1-U4 and any external users, even in case of login credential breaches.

Hence, in some embodiments the alpha blockchain transaction 201 is defined independently of a payload AP associated with said alpha communication action A (see FIG. 4). The corresponding is preferably true for all communication actions handled by the central server 500.

Instead, and as is illustrated in FIG. 4, a metadata part AM of the alpha communication action A is used to determine (or becomes) the metadata 201a of the alpha blockchain transaction 201.

Correspondingly, said beta communication action B may be registered on the same 200 or a different 210, 220 sub-blockchain as for the alpha communication action A, in a beta blockchain transaction 202. Then, a metadata part BM of the beta communication action B may be used to determine, or may become, a metadata 202a of this beta blockchain transaction 202, in a way corresponding to the above-described for the alpha blockchain transaction 201.

This way, all communication actions taken by users U1-U4 of the system may automatically, by respective pieces of software 300, 310, 320 with granted access to respective communication services 400, 410, 420 based on respective main tokens 101, 102, 103, be registered using respective transactions 201, 202 and/or corresponding metadata 201a, 202a, on respective secondary blockchains 200, 210, 220, for the central server 500 to read and correspondingly update respective priority information for the users U1-U4 in question. This can take place completely automatically, and in a way not affecting the normal communication activity of the users U1-U4 once said access grants have been put in place. Each piece of software 300, 310, 320 can execute in the background, even on completely separate hardware, intercepting and/or reading communication actions partaken by the users U1-U4 in question, reporting detected actions by adding suitable blockchain transactions 201, 202 for the central server 500 to read.

As is illustrated in FIG. 3a, the method may comprise the first information consuming piece of software 600 reading the beta communication action B from the second communication service 410 (or the first communication service 400, depending on what communication service the beta communication action pertains to). This may be achieved in the normal and conventional way that the information consuming software 600 reads communication actions for populating the mentioned interactive communication GUI. For instance, the software 600 may be an email client, reading incoming and/or outgoing email messages from service 410 using an IMAP protocol.

Then, the information consuming software 600 may request said priority information from the central server 500, for instance for the first user U1 as a sending user detected by the information consuming software 600 in the communications read from the communication service 410. Hence, the information consuming software 600 may first read a particular set of communication actions from one or several communication services 400, 410, 420 and then, based on the read communication actions and information regarding users U1-U4 to which such communication actions relate in predefined ways, query the central server 500 for priority information for one or several of such detected users U1-U4, based for instance on certain predetermined parameters regarding the relation of such users U1-U4 to such read communication actions.

After the central server has provided the requested priority information to the information consuming software 600, the information consuming software 600 may perform a prioritization step with respect to read communication actions, to achieve a prioritized set of communication actions. Then, the information consuming software 600 may allow the second user U2 to consume the prioritized communication actions. This may, for instance, mean that the second user U2 is presented with a list of read communication actions, such as received emails or social media posts, where the order and/or visibility of such communication actions is affected by the prioritization step. In other embodiments, the communication consuming software 600 is arranged to automatically and electronically relay the prioritized communication actions to a different function or service, such as a third-party service, for further processing. For instance, such further processing may be an information aggregation, filtering or sorting step, and/or electronic storage. As a simple example, the prioritization step may be used as a spam filter, where messages with low-priority users as senders are stripped from a set of read messages.

This way, it is possible to verify, on the first blockchain 200, that the alpha transaction 201 was sent from the first piece of software to the central server 500. Third parties cannot spoof such transactions, and the transactions cannot be removed from the first blockchain 200. Furthermore, the transactions going from various pieces of software 300, 310, 320 to the central server 500 may serve as a convenient way for an operator of the central server 500 to be paid, using the first blockchain 200 as a cryptocurrency in which each UTXO has a certain monetary value.

In some embodiments, all transactions on the secondary blockchains 200, 210, 220, and possibly also all transactions on the main blockchain 100, are publicly available to all users U1-U4 of the system, and to all actors forming part of the system. This makes it possible to verify the truthfulness of all transactions within the system, without any potentially sensitive information leaking. This is true even in the preferred case in which the present system is implemented as a closed system, which may then be open only to users U1-U4 with a system membership (having been awarded with a token of the present type).

As described above, the central server 500 calculates said priority information BI, preferably for each of the users U1-U4 to the system. In some embodiments, said priority information BI for the first user U1 is provided by the central server 500 based on a total, weighted or non-weighted, number of blockchain transactions registered on said first blockchain 200. In particular, the number may be the number of transactions registered on the first blockchain 200 and pertaining to transactions involving the first user U1, and further particularly pertaining to transactions where the first user U1 has the specific role in such transactions as a "sender" or "follower".

In case the priority information BI is based on a "weighted" number of blockchain transactions, the weighting may be any suitable weighting function.

One example of this is that the priority information BI is calculated so that different blockchain transactions on said first blockchain 200, and in particular transactions pertaining to the first user U1 and fulfilling any other mentioned requirements of the types mentioned, are time-weighted, whereby more recently added blockchain transactions on the first blockchain 200 are given more weight than less recent blockchain transactions on said first blockchain 200. In other words, communication actions partaken in the past are allowed to influence the priority information BI to lesser extent than more recently partaken communication actions.

An additional example is that different types of communication actions, such as communication actions originating from particular communication services or that fulfil certain predetermined criteria in terms of the contents of the metadata of the respective transaction, are more heavily weighted than other communication actions.

In general, it is preferred that each of said pieces of software 300, 310, 320 is arranged to create respective blockchain transactions corresponding to read communication actions in the same order as the communication actions in question were taken. The corresponding is also true for the order in which these blockchain transactions are incorporated in their respective blockchain.

As mentioned above, the first blockchain 200 may be used to register communication actions taken by the first user U1, in some cases even exclusively by the first user U1.

Correspondingly, the second blockchain 210 may be used to register communication actions taken by the second user U2 (in some embodiments exclusively by the second user U2). The corresponding is then true also for the third blockchain 220 and the third user U3. It is noted that the first 200, second 210 and third 220 blockchains are different blockchains, each having been initiated based on a respective main token 102, 103 that in turn is cryptographically tied to one and the same main blockchain 100 in the way discussed above.

Notice also that this is merely an example, and that the second blockchain 210 will be described below, in other examples, as a sub-blockchain devoted to register communication actions partaken by the first user, in addition to the first blockchain 200.

Then, priority information BI with respect to the first user U1 may be provided by the central server 500 further based on a total, weighted or non-weighted (with the corresponding meaning as above), number of blockchain transactions registered on at least the second blockchain 210 and the third blockchain 220. In particular, the blockchain transactions from the second 210 and third 220 blockchains counted may then be those transactions that involve the first user U1, and further particularly pertaining to transactions where the first user U1 has the specific role in such transactions as a "receiver" or "followed". In typical cases, transactions are counted that do not involve the first user as an "initiator" of the communication action in question.

Hence, the priority information BI may be calculated based on the number of times the first user U1 was a sender of messages and/or followed other users U2-U3, and also based on the number of times the first user U1 was a recipient of messages and/or was followed by other users U2-U3.

In one useful example, the first user U1 being a sender or a follower decreases the priority information BI for the first user U1, while the first user U1 being a recipient or a followed one increases the priority information BI for the first user U1. This will lead to the priority information BI over time being a measure of the projected relevance of communication actions taken by the first user U1 from the point of view of other users U2-U4, and can therefore be used by a piece of information consuming software 610 used by the second user U2 to view incoming communication messages, to prioritize incoming communication messages, for instance, from the first user U1 in relation to incoming communication messages from other users U3, U4.

As mentioned above, the central server 500 may calculate such priority information BI for individual communication actions and/or for individual users U1-U4. Then, the central server 500 may provide an API arranged to provide the priority information BI in question to querying parties, such as different pieces of information consuming software 600, 610, 620.

In particular, the central server 500 may calculate a respective piece of priority information BI for each of a plurality of users of the system, such as users U1-U4, based on information comprised in various blockchain transactions on at least the second 210 and the third 220 blockchains. Then, the central server 500 may make said pieces of calculated priority information BI available via said API in the way discussed above.

In certain embodiments, the central server 500 may calculate a respective piece of priority information BI, in the above described manner, so that each communication action taken by a particular user, as evidenced by a detected corresponding registered blockchain transaction, results in that a piece of calculated priority information BI for the user in question comprises or is associated with a lower priority status than what would have been the case in the absence of such communication action. As discussed above, this may at least be true for communication actions where the user in question has a "sender" or "follower" role, such as the user being an "initiator" of the communication in question, while communication actions where the user in question has a "recipient" or "followed" role, such when the user is not an "initiator", may in certain embodiments result in that the priority information BI for the user in question comprises or is associated with a higher priority status than what would have been the case in the absence of such communication action.

Turning now to FIG. 3b, a continuation of the exemplifying method illustrated in FIG. 3a is shown. Here, the third user U3 takes a communication action in the first communication service 400, in a way corresponding to how the first user U1 was above described to take a communication action in the first communication service 400.

This is preceded by the third user being provided with a third main token 103, which is cryptographically tied to the main blockchain 100 in a way corresponding to the tie thereto of the first main token 101. However, in this example the third user U3, after having provided the third main token 103 to the third piece of software 320 so that the third piece of software 320 is provided access on behalf of the third user U3 to the first communication service 400, the third user U3 takes some action to inactivate this access by the third piece of software 320. For instance, the third user U3 may change the login credentials to the first communication service 400 or in any other way revoke or inactivate the access token held by the third piece of software 320. Then, when the third user U3 takes said communication action no corresponding transaction is registered on the third blockchain 220 (corresponding to the third user U3).

However, the first piece of software 320 automatically detects that it has lost its read access to the first communication service 400 on behalf of the third user U3. The first piece of software 320 reports this detected access to the central server 500.

Once it has been determined by the central server 500 that the third piece of software 320 no longer has said read access, the central server 500 automatically lowers a priority status (updates the priority information) associated with the third user U3.

Another way for the central server 500 to note that no detection of communication actions is possible is in the preferred case in which all pieces of software employ a heartbeat or other keep-alive protocol with the central server 500, so that the central server 500 may detect when a communication channel of the piece of software in question is deactivated. This may lead to a corresponding automatic lowering of the priority status of the user in question.

It is generally preferred that the central server 500 handles, and stores, communication action A, B metadata AM, BM of the type discussed herein, pertaining to communication actions performed by different users U1-U4 of the system, without storing corresponding communication action payloads AP, BP.

As discussed, the metadata AM, BM associated with read communication actions may comprise information identifying a communication action counterpart. This communication counterpart information may be present in a form and place where it is accessible by the central server 500. For instance, it may form part of the metadata AM, BM read by the piece of software 300, 310, 320 in question and subsequently reported to the central server 500. In another example, it may form part of the blockchain transaction metadata 201a, 202a and therefore be readable by the central server 500 from the sub-blockchain 200, 210, 220 in question.

In the example shown in FIG. 3c, the fourth user U4 takes a communication action in the third communication service 420, which communication action has the first user U1 as communication counterpart. For instance, the first user U1 may be specified as "recipient" of an email sent by the fourth user U4. The first piece of software 300 detects and reads this communication action, in the way described above and based on the first user U1 being identified in the communication action, by the first user U1 having provided the first piece of software 300 a granted access to a communication service in which the taken communication action is detectable, in this case the third communication service 420. The first piece of software 300 reports of the detected and read communication action to the central server 500, which in turn calculates priority information with respect to communication actions taken by the fourth user U4. In this particular example, the fourth user U4 has not been provided with a main token of the above type, for instance since the fourth user U4 is not a member of the system. Despite this, the fourth user U4 is identified in the communication action, for instance in the form of a sending email address, and the central server 500 calculates the priority information for the fourth user U4 based on this information. In other words, the fourth user U4 is specified in the communication action counterpart metadata as a communication action counterpart to the first user U1, and it is based on this communication counterpart information that the central server 500 identifies the fourth user U4.

In a corresponding but opposite example, a user who has in fact been provided with a corresponding main token of the above type, such as the first user U1, takes (in a role as initiator, sender or follower) a communication action in relation to said fourth user U4 (the fourth user U4 again not having been provided with a respective main token of said type). Then, the central server 500 identifies the fourth user U4 based on the metadata of the communication action in question, read by the first piece of software 300 from the third communication service. Then, the central server 500 calculates the priority information for the fourth user U4 based on the detection of the fourth user U4, as a recipient, receiver or followed, of said communication action initiated by the first user U1.

Hence, users external to the system may be tracked by the central server 500 by them occurring as communication action counterparts, as read by corresponding communication action metadata. It is realized that such external users can occur both as senders/followers/initiators and recipients/followed/acceptors with respect to their role in various communication actions. However, it is preferred that only communication actions in which such external users occur as recipients/followed/acceptors, in other words only for communication actions originating from within the system to external users, are counted for calculating priority information for such external users. In other words, when users having been awarded main tokens ("system-internal users") initiate communications to users that have not been awarded main tokens ("system-external users"), priority data may be calculated for the non-initiating external users based on such detected communication actions.

This provides for a convenient way for the central server 500 to update a respective priority information for each such detected external user based on a number of detected communication actions and a respective type of role of the external user in question in each such communication action. For instance, when system-internal users interact with a system-external user by such system-internal user initiating communication actions in relation to the system-external user, for instance by the system-internal users sending emails to the external user's address, the priority for the external user in question may be increased. In some embodiments, a priority for such an external user is calculated further based on a priority information of the communication action-initiating system-internal user. When the system-internal users interact by the external user being in an initiating role, such as system-internal users receiving emails from the external user's address, the priority for the external user may be decreased. The central server 500 may also be arranged to automatically detect hitherto unknown system-external users and to add them to a list of such detected external users, preferably at least when they are detected in a non-initiator capacity of a communication action.

Then, the central server 500 may keep this list of such detected external users, together with respective priority information, and external users with a priority above a certain threshold (such as a set value or in terms of a rank in relation to other external users) may be offered membership in the system. In case such membership is awarded and accepted, the external user in question may be provided with a main token as described above, and start using a respective software function populating a respective sub-blockchain as the user performs communication actions.

As is illustrated in FIG. 4, the alpha blockchain transaction 201 comprises a transaction identifier AID. The corresponding is true regarding the beta blockchain transaction 202, and possibly all sub-blockchain transactions. In some embodiments, each such identifier is unique for the combination of communication action and communication action counterpart.

In the example shown in FIG. 4, the alpha communication action A involves an alpha communication action counterpart user as a part of the alpha communication metadata AM. The alpha blockchain transaction 201 then comprises a transaction identifier AID which is unique for the combination of communication action itself and the counterpart in question. It is realised that the transaction identifier AID may be any piece of information, such as a simple counter. In other alternatives, it may be calculated based on information related to the communication action in question and/or the counterpart in question. For instance, the transaction identifier AID may not form an explicit part of the transaction 201, but instead be calculated when needed.

In some embodiments, the alpha communication action A is taken in relation to more than one communication action counterpart user. For instance, the first user U1 may send an email to several concurrent recipients, each then being identified as a counterpart in the alpha communication metadata AM. Then, in the schema presented in FIG. 3a the first piece of software 300 may automatically create one individual blockchain transaction on the first blockchain 200 for each of said communication action counterpart users, each comprising or being associated with a unique respective transaction identifier AID of said type. In other words, one communication action may result in several sub-blockchain transactions, one for each combination of counterpart users defined by the communication action. This may be correspondingly applied for other types of communication actions than emails, and also for the case in which the first user U1 is one of several recipients (or corresponding non-initiating role) of a communication action.

Alternatively, each sub-blockchain transaction may relate to one or several communication counterparts, as identified in said metadata.

FIG. 3d illustrates another example of a communication action processed by the present system, which may be taken after one or several of the steps discussed above. In particular, the FIG. 3d steps may be preceded by some or all of the steps shown in FIG. 3a and discussed above.

In FIG. 3d, the first user U1 grants the second piece of software 310 access to a second user account 411 of the second communication service 410.

In general, each communication service 400, 410, 420 may be associated with its own respective software function, or one and the same software function may be used to detect communication actions in several different communication services. Furthermore, in general each communication service 400, 410, 420 may be associated with one particular respective user, or be arranged to serve several users in parallel.

Then, the first user U1 takes a gamma communication action C in the second communication service 410. The second piece of software 310 automatically reads the gamma communication action C, in the general way described above and using said granted access, and as a result automatically creates a gamma blockchain transaction 203 on the second blockchain 210. It is noted that the second main token 102 above has been described as being devoted to the registration of communication actions on behalf of the second user U2, but that in this present example the second blockchain 210 is instead exclusively for registering communication actions partaken by the first user U1, in addition to the first blockchain 200. In case the two embodiments are to be combined, these two blockchains 210 will be different.

The second communication service 410 processes the gamma communication action C, in the general manner described above for the alpha communication action.

As mentioned, the second blockchain 210 is created based on the second main token 102, which in this case has been provided to the first user U1 from the central server 500 for use in relation to a first user U1 user account with the second communication service 410. In some embodiments, the second blockchain 210 may also be created on the same first token 101 as used to create the first blockchain 200, said first token 101 then having been provided to the same first user U1.

In a way similar to the alpha blockchain transaction 201, the gamma block-chain transaction 203 created by the second piece of software 310 comprises specific metadata 203a regarding the gamma communication action 203. See FIG. 4, that also shows the gamma communication action payload CP and metadata CM, as well as the corresponding identifier AID. All this corresponds to the alpha A and beta B communication actions also illustrated in FIG. 4.

The second piece of software function 310 incorporates the gamma blockchain transaction 203 in the second blockchain 210, and the central server 500 reads the gamma blockchain transaction 203, such as from the second blockchain 210, in the general way described above. The central server 500 may then update the priority information for the first user U1 based on the read gamma blockchain transaction 203, and in particular said metadata 203a. It is noted that the first user U1 priority information at this point is calculated based both on the automatically detected occurrence of the alpha communication action A and on the automatically detected occurrence of the gamma communication action C. Furthermore, in case the beta communication action B described in connection to FIG. 3a was also captured by the central server 500 (which needs not be the case, depending on detail configuration and prerequisites), the automatically detected occurrence of the beta communication action B may also form a basis for said priority information calculation for the first user U1.

Then, the first user U1 takes a delta communication action D in the third communication service 420. The first information consuming software 600 may read this delta communication action D as described above, for instance to provide a different user than the first user U1 (such as the second user U2) with an updated view of communications among which the delta communication action D occurs, and query the central server 500 for an updated priority information regarding the first user U1. The central server 500 responds with the updated priority information DI for the first user U1, and performs a prioritization of the information based upon the received priority information. Then, the second user U2 consumes the prioritized information, as generally described above.

Hence, in this example the priority information DI regarding the delta communication action D is calculated based on both the alpha 201 and gamma 203 blockchain transactions.

As mentioned above, each of the communication services used by the present system can be of various types. In particular, they may support communication actions based on different protocols. As an example, said gamma communication action C may be performed using a different communication protocol than said alpha communication action A.

Furthermore, each of the communication actions described herein may be individually selected from the group containing sending an e-mail or other digital, electronic message using a predetermined communication protocol; digitally, electronically following or requesting a follow of a social media user; digitally, electronically sharing or posting a piece of information; and digitally, electronically inviting a user to participate in a particular digital context.

In the following, a number of generally applicable characteristics of the present invention are discussed.

Permissioned blockchain network (forming a closed system): Only users that have joined the system (here called "members") may be allowed to create blockchain transactions of the present type (via the respective software function), and only users that are allowed by the central sever to join can become members. Only members may be able to influence priority information in the system. However, members may still be able to interact with non-members (non-member priority information may still be measured).

Two-tiered blockchain: The main blockchain manages transactions to create memberships in the system (main tokens), while the secondary blockchains (such as one for each membership) manages every transaction involving its respective member. The main blockchain contains a reference to the beginning of every secondary blockchain, which are therefore like "branches" from the main blockchain. All data in both tiers may be secured by per se conventional typical digital signatures and encryption procedures found in conventional blockchain networks, such as Hyperledger.

The role of the main blockchain and the secondary blockchains (sub-blockchains): The main blockchain manages primary token transactions autonomously. The central server issues one (or several) independent, non-fungible tokens to each member which grants access to the system on equal terms, allowing that member to have a priority information and to create secondary (sub-blockchain) transactions (in other words, it creates one or several "personal blockchains" for each member).

Each secondary blockchain branch may be managed by the member who owns it, and may be "witnessed" by the central server. The central server may be considered a party to all secondary transactions, autonomously and passively, but the member still has complete control over the creation of new secondary transactions, via their behaviour in relation to the various communication services and via the mechanism using said software functions. Each secondary transaction is unique and records the member's behaviour in such a way that no single action can be counted twice in the system. The transaction that represents an email being sent, for instance, is cryptographically tied to that email, and can only represent that specific email.

Secondary transactions are created via one member's actions that are received by one or more parties, which may or may not be members. These transactions follow a sender-receiver or buyer-seller type of model. As an example, a secondary transaction can be created when a member sends an email to anyone. Secondary transactions for any given member may be only visible to the members involved (it is preferred that non-members are not allowed to have access to any information in the system, for instance using login credentials for members to view such information). Transaction visibility can range from a scenario where the parties can only see specific transactions involving themselves (all other transactions are invisible to them), or a scenario where any member involved in any transaction with a member can see all of that member's transactions.

Priority information as "reputation": Each secondary transaction may be seen as having a "price" measured in terms of "shares" of the member's total value. In some embodiments, said priority information may be calculated based on such "shares", being unique and created specifically for each transaction. Each sub-blockchain transaction then represents one such share. Each new such share may be used to proportionately dilute the value of all shares previously created by that member, as a result of the calculation of the priority information for the member in question. With such an approach, sub-blockchain transactions can be viewed as each holding a share of a member's total "reputation" in the system with respect to partaken communication actions in the past. Each sub-blockchain transaction may then be viewed as the transfer of one share of reputation from the initiating user to each target user.

A user initiating messages will then do this at the cost of "share value", and the "share value" will increase when the user is subject to communications initiated by other users. The proof of this may then be in the form of corresponding blockchain transactions incorporated in the sub-blockchain in question where the user appears as non-initiator (target). This way, each sub-blockchain contains all information that is required to calculate a total reputation value of the user/account/address pertaining to the sub-blockchain in question. This total reputation value may the be compared to a total system reputation to achieve a total relative reputation value for the user/account/address in question.

Completed sub-blockchain transactions may transfer the value of the new share to the communication action recipient, which is then counted to the recipient's total value. A member's "reputation" is then equal to one share of that member's value at any given time.

Reputations (i.e., the value of all shares for a particular member, shares belonging to all members) may be continuously calculated by the central server, based on the growing sub-blockchains. Since value is transferred with every transaction, since there can be any arbitrary number of transactions, and since reputation is measured relative to other reputations in the system (i.e., the total reputation in the system may be fixed), calculations may preferably happen continuously, as data becomes available.

In some embodiments, priority information is only affected by communication actions initiated from within the system, in other words leading to the creation of sub-blockchain transactions on the initiating user's sub-blockchain. This may be the case regardless of who "receives" the reputation. In other words, only communication actions initiated by members to the system are then counted. Hence, if a member in this case sends an email to a recipient the central server 100 does not recognize, a new node may be created for the recipient in a reputation database graph held by the central server, even though the user in question is not a member. As a result of this, non-members can still have a reputation.

In some embodiments, the presence of the piece of software monitoring used communication services via said access grant is compulsory for members. This may be enforced by each such piece of software communicating with the central server, and when this communication stops, or the central server otherwise detects that the piece of software is no longer actively monitoring and reporting activity in the communication service on behalf of a particular user, this may lead to an automatic effect on that member's priority information (such as an automatically imparted reputation downgrade performed by the central server).

In the concrete example of a communication service in the form of an email service, the piece of software may comprise a proxy which performs a cryptographic self-lock (described above), resulting in that nobody (not even system software developers) can gain access to any data that passes through the proxy. The proxy is arranged to always by synchronized with the email traffic of the member in question in close to real-time. If the piece of software is disconnected from the email service, this is virtually immediately detected by the piece of software and reported to the central server.

Furthermore, the central server may actively cross-check communication actions involving several members with different roles in the communication actions in question, using corresponding sub-blockchain metadata, and systematically monitor for communication actions where there should be a counterpart sub-blockchain transaction but non is found in that particular sub-blockchain in question. If this is found to be the case, the member for whom such transactions are lacking may be automatically punished by an automatically performed reputation downgrade of the above described type. It is particularly noted that this can take place without any potentially sensitive data becoming known.

Priority information calculation and publication: Calculated reputations may be stored by the central server as a graph data structure, which is visible to every member of the system, via the central server API. Data may be passed to, and received from, the calculation "engine" of the central server autonomously, via blockchain smart contracts or similar, and may be fully secured at all stages. This way, even the persons programming the system software may have no access to any sensitive data at any time.

Reputations may be provided as product features or used in further calculations for personalisation in information consuming software. Optionally, the "evolution" of reputations can be provided in public, so every transaction can be traced to a "differential" which was calculated off-chain, without revealing any personal data.

Membership status: Membership permissions for the system may be dynamically and automatically determined by member behaviour. Invitations to join the system as a member may be issued electronically and digitally by the central server automatically to non-members who satisfy predetermined or calculated reputation thresholds and/or other predetermined criteria. Memberships can be similarly automatically revoked if thresholds/criteria are not met. Optionally, this even allows non-members to "check" their invitation status from the outside of the system, or members can check the status of their own contacts, and that status can be verified in a "trustless" way.

Blockchain implementation: Transactions are not created directly by members (like, for instance, is the case for bitcoin), but are instead created indirectly, using said mechanism with the software function, when a member performs defined behaviour(s) with respect to said communication services. These behaviours, such as sending an email, require involvement from communication services before a sub-blockchain transaction is created. The present system monitors those communication systems rather than the members directly, and no human has access to any member data at any time. Per se conventional consensus mechanisms and distributed ledger visibility can provide additional security in this process, but "mining" by parties outside the system is preferably not allowed like in many other blockchain networks. Members simply do what they would do normally with respect to the used communication systems, and the system provides, via said primary and secondary blockchains, a layer of transparency and security underneath. In that sense, the present system is not completely decentralized. However, because transactions follow a sender-receiver or initiator-target type of model, there are always at least three parties who can verify the source of a transaction: the sender, the receiver, and the central server.

User incentives: Various practical features can be added to the calculations to fine-tune the incentives in the system. For example, it is often helpful to let shares "decay" over time, such as using the weighting described above, so that reputations reflect recent activity more than past activity.

In the following, some exemplifying concrete applications of the present invention will be described.

With a similar logic as above, email senders that are abusive marketers, or phishing scammers rely on the economics of "mass emailing" to make their tactics work—even if very few recipients perform a desired action, the cost of sending massive amounts of emails is low enough for it to still be profitable.

Conventional email clients (information consuming software in the terminology used herein) do not know the reputation of a new contact (and usually sort emails by the time they were received), resulting in that spammers end up at the top of the inbox and get maximum attention. After a user has realized they have been scammed, or when they unsubscribe, other users will still not know about the problem, so the spammer is protected.

Using the present solution, these incentives are reversed, because the system will know when a sender is sending large amounts of emails and getting relatively few replies, and will automatically punish that behaviour by determining a low priority score for the spammer. In other words, spamming behaviour will decrease the sender's reputation and give them less or even minimum priority. The same goes for personal email traffic that cannot (but should) be properly identified as spam using automatic algorithms. For instance, using the present solution the well-known problem of phishing is also solved.

Conventional "reputation systems" try to measure reputation with some sort of explicit voting mechanism. In such systems, the voting data is shown publicly so it can be trusted, and the votes are explicit (in the form of clicks, followers, etc.). This makes it possible for users to fool the system. For example, if public upvotes are used to determine which articles/voters get the highest reputation, this requires public vote data and explicit user actions to make votes.

Email data, however, is private/sensitive, and "votes" for every single email is neither safe nor practical or efficient. The present invention offers a way to provide priority/reputation data in public for high-volume actions that are done in private. By using the blockchain mechanisms described herein, it becomes possible to show the internal system community where the reputations come from, making it possible to trust the system. Using said blockchain setup, data is made visible in a secure manner, without revealing the underlying private details. Hence, both the reputation "source" and "result" are public. Communication message payloads may remain completely end-to-end encrypted and protected from eavesdropping at all times.

Moreover, the present invention automatically measures actual communication activity rather than collecting votes, requiring no additional activity on part of communicating members after the initial setup procedure. Sending a real email, for instance, has a cost in terms of time and visibility (the receiver will see it). That makes it less convenient to manipulate, and requires many more coordinated senders and receivers to manipulate reputation. In case the system is a closed system, open only to members, reputation manipulation becomes virtually impossible since a low priority may endanger the member's membership.

In summary, the present invention offers a transparent and secure reputation mechanism based on private data and implicit actions.

The present system may be a permissioned blockchain network, in the sense that the access to the information in the main blockchain and the sub-blockchains is limited. This means that, firstly, only members are provided with reading access to any of these blockchains. Secondly, each user may have full read access to any sub-blockchain created using a primary token awarded to that user in question. Thirdly, it may be the case that no user has read access to sub-blockchains created using a primary token not awarded to the user in question. In other words, users may only have access to "their" sub-blockchain(s). The central server 500 may have full read access to all sub-blockchains. This achieves that the central server 500 has control over the system memberships themselves (via the awarding of the primary tokens, effected using the main blockchain), but not over the sub-blockchain transactions individually (since they are created by the respective software functions and cannot be controlled by the central server 500 even if originated from the central server 500). In the preferred case in which users have read access to the main blockchain 100, every user can verify that the central server 500 has awarded any other user system membership in the form of a respective primary token. Also, since every user can see the entire chain of their own transactions (i.e., e-mails), they are able to cryptographically prove that every e-mail is represented by a blockchain transaction, and that every blockchain transaction represents a real e-mail (remembering that only the user herself has access to all her e-mails). Furthermore, recipients in the system can be given read access to a sending user's secondary blockchain in such a way that they can also prove that the sender's secondary blockchain has not be tampered with, and so that they know they are "receiving" reputation in a trusted way. This way, a cross-connection mechanism is automatically built into the block-chained data between users of the system, making the system difficult to tamper with both by users and an operator of the central server 500. In a system with only one single blockchain, none of this is true.

Example 1

User X wishes to send an email.

User X already has an email address, provided by an email provider.

User X has been invited to join the system because they (or, more correctly, said email address) have a high number of detected connections to already existing members of the network, and the behaviour of those existing members has given User X a high reputation (priority information being calculated based on interactions with User X as target, and further based on priority information of originating users of such actions), relative to everyone else in the system. Those thresholds are not fixed, but are instead arranged in a ranked list of current known non-member reputations at any given time. Current members are able to send invitations, via a web service provided by the central server, to non-members among their personal connections that qualify.

User X accepts the invitation by logging into their invited email account via a web page hosted by the central server, which automatically generates the required blockchain identity and user account on the central server, enabling User X to use an application provided by the central server; any third-party email application; or any other email interfaces that allows them to send email through the provider of the qualified email address. If User X attempts to join the system using a non-qualifying email address, they will not be able to join/log in.

A secure proxy is automatically created for User X with encrypted credentials that are only accessible from that user's logged-in system account so that no human can access the proxy in any way, including the central server. The proxy begins monitoring the user's email account for activity, and any emails sent or received by the account are encrypted, end-to-end in a machine-readable way, so data can be collected without ever having human-readable or decryptable data during transit or on the central server. All encrypted data is removed from the proxy instantly after data has been properly collected for reputation purposes.

The email service provider also provides an access token to the proxy, as described above, to have continuous access to the user's email account. This process is usually OAuth 2.0 or higher, and involves User X logging in to said email service, such as via a web interface.

To send an email, User X can log into any email application, whether it is said system-native application, their email provider's own web application or a third-party email application which communicates with the email provider's server. User X composes and sends an email in the normal, conventional way.

When the email is sent (that is, when the user clicks "send"), the typical communication with the external email server occurs—regardless of which application is used to create the email message itself) and the email is sent via typical email channels without any intervention from the present system. When the email server has sent the message, it places a "sent email" in the appropriate folder in the user's email account. Via IMAP or similar, this update is instantly recognized by the proxy, such as via webhooks or a similar mechanism, and the new sent email triggers a transaction-creation lifecycle in the system according to the following:

A respective secondary blockchain transaction is created to uniquely represent every sent copy of that email, in other words one such transaction per intended recipient. The blockchain transaction itself is a very simple set of data, namely the encrypted sender ID, recipient ID(s), a unique email ID, a timestamp, and any other metadata that might be useful for reputation calculations. The email message itself (the payload) is not included in the blockchain transaction in any way.

The blockchain transaction(s) are automatically and digitally signed by the proxy (that is, cryptographically approved by User X's system blockchain identity) and then validated by the central server to ensure that the transaction has been created by a valid account and includes a totally unique email. Since there is no outside user access (for instance, no "miners"), transactions are very difficult to forge. It is also be possible that the central server keeps a list of approved email providers that are the only ones that can be used to send email messages within the system.

The central server validates the sub-blockchain transaction, and if validation is successful the transaction in question is added to a new block in User X's (secondary) blockchain. Eventually, the new block is added to both User X's blockchain and copied to every member recipient's secondary blockchain automatically. The central server has full visibility of the (encrypted) details of all transactions. Each member has full visibility of any transaction that includes themselves.

When a transaction is added to User X's blockchain, it represents the creation of a new "share" of reputation value. That "share" is recorded by a reputation graph, which automatically sends reputation data to a reputation algorithm, which is incremented continuously. Updated reputation scores are sent to the public reputation graph periodically, and those scores are visible to all users/applications in the system.

Example 2

The information consuming software may comprise an inbox that sorts itself, and automatically brings messages from the most prioritized people to the top, based on known relationships. This may be done by considering a number of factors, but the main factor is the system-global reputation of each sender. This is useful for any email user, but for users who receive hundreds of real, genuine emails every day this automatic sorting can literally save months of time per year. In theory, this could be done for each individual user just by using their own archived email history. However, that approach creates some hard-to-solve issues.

Specifically, there is the question of what to do about senders that the user doesn't know yet? For instance, if the Prime Minister of Sweden emails the user for the first time, they would have no reputation with that particular user, so they would have to be at the bottom in such a system. The present system, in contrast, combines information from all users of the system, why it is possible to automatically know that the Prime Minister of Sweden has a very high priority and should rank high in anyone's inbox. At the same time, a number of persons being very important to the particular considered user may have higher priority than the Prime Minister and should therefore be ranked higher for that user.

Conventional social networks use entirely different technical solutions for prioritizing between user-created content.

In the present example, User X wishes to "check their email" via an inbox application (the information consuming software). This is done by clicking a "refresh" button in the inbox application.

Between refreshes, the User X secure proxy is monitoring the email account for new mail constantly. When new email is found, if User X is logged in, new email is transferred to a frontend of the inbox application. At the moment when User X manually refreshes the inbox by pressing the button, the inbox application inspects all the unread messages in the User X email account, and compares them with the reputation score (priority information) of each sender of those unread emails. Additional factors, such as the number of previous emails sent to each sender by User X, may be used to create a weighted reputation score which is personalized for each user. The inbox application then re-sorts the inbox so the senders of unread emails (not the emails themselves) are in order of personalized (weighted) reputation.

Personalization is done for each user at the moment of refreshing, by the front end, using data that is not available outside of that particular user's logged-in account. This avoids the central user ever having access to a personal behaviour profile of any individual users, but instead only handles aggregated, anonymised data. Previously read emails and starred emails may also be used such that the current "state" of the inbox is a sorting factor. "Old" emails and inactive senders may automatically be archived/removed from the inbox after a certain number of manual refreshes. This ensures that User X always sees the most relevant, most trustworthy people at the top of the inbox at all times. Senders with low reputations (scores under a predetermined or dynamically determined absolute or relative score) and/or unknown reputations may be given less or minimal visibility (and may even blocked), and the inbox may be arranged to never contain senders who were not relevant recently.

The general inbox state may remain the same until the user manually refreshes or logs in from scratch again. This means that new emails do not automatically get "delivered" into the GUI of the information consuming software. This is generally preferred, since such an automatic delivery would result in unpredictable reshuffling of the inbox due to updated reputational scores for senders. In some cases, newly received emails may appear in a predictable location in the interface, such as at the top of the list of emails, whereas resorting of the emails according to reputation may take place only when the user hits "reset" as described.

User X can read, reply, archive, star, search, and navigate their emails and archive, in a way similar to in conventional email applications, with the difference that the inbox is organized around people rather than email threads. Only emails and actions created by system members will affect reputation scores, as described above.

The user may also check their mail in any other email application as usual, but then not using reputation-based features.

Figure 5:
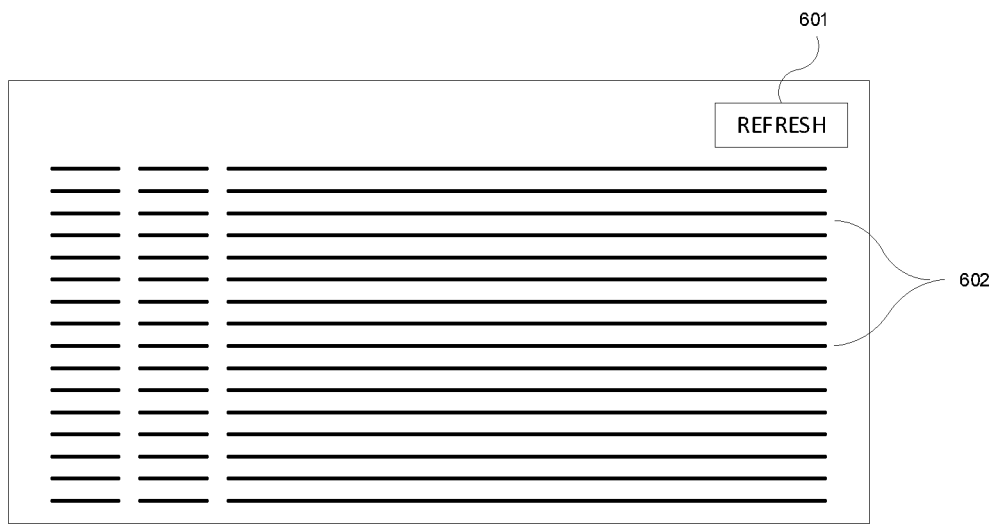
FIG. 5 illustrates a GUI of an information-consuming software.

FIG. 5 illustrates such a GUI of such an information consuming piece of software 600, featuring a "refresh" button 601 and a list of e-mails, sorted according to the above-described principles.

In the above examples, the use case of populating an email inbox has been used. However, it is realized that this is only an example. Other examples include information consuming software in the form of self-organizing group chat message feeds, social media feeds and other communication feeds and inboxes. Furthermore, the principles described above can be used in work-organizing software, for instance in the form of a self-organizing task list populated by several users for particular users to perform. Such users may be human users or machine users. For instance, in a machine-to-machine software-based collaboration solution, a task-driven workflow can be self-organized by various machine entities posting tasks to be performed by other machines, and such task-executing machines may prioritize between posted tasks based on the priority information calculated as described above, meaning that a machine posting many task request would be served with lower priority by other machines, at least for a period of time.

It is also noted, in case the users are human users, that a sorting of an inbox or similar is not merely presentation of information. Firstly, the email information in itself is information that is presented. However, the present invention achieves the technical effect of selecting what information to the presented, not how the information is to be presented. For instance, in a given inbox there is both a particular message order and a selection as to what messages are displayed at all. The GUI illustrated in FIG. 5 may, for instance, be able to show more e-mails than what fits on one single screen, so the present system is operable to select what data to display rather than how to present the data.

Hence, from this viewpoint the present invention is a filtering method, where communication actions associated with particular user priority information (such as low-rank priority) are filtered out of a set of information.

Hence, the present method may further comprise a filtering step, in which an entity being external to the central server, the entity in question for instance being an information consuming piece of software of the type described herein, performs a filtering, sorting, ordering and/or ranking of communication messages with respect to a particular communication actor (such as a user of the type described herein), based on priority information provided by the central server as described herein. In one example, such filtering may constitute part of, or be, a spam filter and/or an automatic message sorting/ranking system.

Furthermore, a message inbox is a technical tool which is interactive. Depending on what is displayed in the inbox, the user can and will take different actions. For instance, if a message is displayed with higher priority (such as at the top of the inbox), the user can and will select, view and process (such as reply) that message as a direct result of it being displayed with higher priority. Similarly, a low-priority displayed (or even non-displayed, filtered out) message will result in the user not selecting, viewing and processing that message.

Above, preferred embodiments have been described. However, it is apparent to the skilled person that many modifications can be made to the disclosed embodiments without departing from the basic idea of the invention.

For instance, it has been described above that transactions can be created and incorporated by the mechanism described above, with particular pieces of software being granted access to communication services and reading communication actions partaken therein. This provides a mechanism for existing communication services to be used in a seamless manner with the present system. However, it is also possible that one or several communication services are built specifically to be adapted to cooperation with the central server 500, and hence include functionality for creating and incorporating sub-blockchain transactions in the way performed by the piece of software as described above. In this latter case, no specific piece of software is necessary for such communication services.

Above, many details have been disclosed and discussed in connection to different embodiments. It is realized that all such details have been disclosed in different concrete context in order to more clearly explain the principles of the present invention, and that such details are freely combinable as long as they are not contradictory or incompatible. For instance, the detailed methodology described in relation to FIG. 3a is generally applicable also to the processes illustrated in FIGS. 3b-3d.

Furthermore, all which has been said above regarding the present method is equally applicable to the present system, and vice versa.

Hence, the invention is not limited to the described embodiments, but can be varied within the scope of the enclosed claims.

The invention claimed is:

1. A method for managing digital, electronic communication, comprising the steps, performed before a first point in time, of:
   a) providing or identifying, by a central server, a main blockchain;
   b) providing, by the central server, a first main token, cryptographically tied to the main blockchain, to a first piece of software associated with a first user; and
   c) the first user granting the first piece of software access to a first user account of a first digital, electronic communication service, so that the first piece of software thereby automatically and autonomously can access the first user account to read communications of the first communication service without the participation of the first user,
wherein the method further comprises the steps, performed after the first point in time, of:
d) the first user taking an alpha communication action in the first communication service;
e) the first piece of software automatically reading the alpha communication action, using the granted access, and as a result automatically creating an alpha blockchain transaction on a first blockchain, the first blockchain being a sub-blockchain of the main blockchain and initiated based on the first main token, the alpha blockchain transaction comprising or being associated with metadata being specific regarding the alpha communication action, the alpha blockchain transaction being defined independently of a payload associated with the alpha communication action;
f) incorporating, by the first piece of software or the central server, the alpha blockchain transaction in the first blockchain and the central server reading the alpha blockchain transaction;
g) the first user taking a beta communication action in the first communication service or in a second digital, electronic communication service; and
h) the central server providing priority information regarding the beta communication action based on the alpha blockchain transaction, the priority information being provided further based on a total, weighted or non-weighted, number of blockchain transactions registered on at least a second blockchain and a third blockchain, that are not the same as the first blockchain, each of the at least second and third blockchains being initiated based on a respective main token that is cryptographically tied to the main blockchain.

2. The method of claim 1, wherein the alpha communication action is processed by the first communication service.

3. The method of claim 2, wherein the alpha communication action is processed by the first communication service after the reading by the first piece of software, independently of the alpha blockchain transaction.

4. The method of claim 1, wherein the method furthermore comprises an information consuming piece of software allowing a second user to consume respective results of several communication actions taken by different users, and wherein the priority information is used by the information consuming piece of software to prioritize between the communication actions.

5. The method of claim 1, wherein the first main token is only provided to the first user, and wherein the first blockchain is a permissioned blockchain that can only be accessed using the first main token.

6. The method of claim 1, wherein the priority information is provided based on a total, weighted or non-weighted, number of blockchain transactions registered on the first blockchain.

7. The method of claim 1, wherein the priority information is calculated so that different blockchain transactions on the first blockchain are time-weighted, whereby more recent blockchain transactions on the first blockchain are given more weight than less recent blockchain transactions on the first blockchain.

8. The method of claim 1, wherein the central server calculates priority information for individual communication actions and/or for individual users, and provides an API arranged to provide the priority information in question.

9. The method of claim 8, wherein the central server calculates a respective piece of priority information for each of a plurality of users, based on information comprised in various blockchain transactions on at least a second and a third blockchains, that are not the same as the first blockchain, each of the at least second and third blockchains being initiated based on a respective main token that is cryptographically tied to the main blockchain, and wherein the pieces of calculated priority information are made available via the API.

10. The method of claim 9, wherein the central server calculates a respective piece of priority information so that each communication action taken by a particular user, as evidenced by a detected corresponding registered blockchain transaction, results in that a piece of calculated priority information for the user in question comprises or is associated with a lower priority status than what would have been the case in the absence of such communication action.

11. The method of claim 1, wherein the central server stores metadata pertaining to communication actions performed by different users, without storing corresponding communication action payloads.

12. The method of claim 1, wherein the alpha communication action involves an alpha communication action counterpart user, and wherein the alpha blockchain transaction comprises a transaction identifier which is unique for the combination of communication action and communication action counterpart in question.

13. The method of claim 12, wherein the alpha communication action is taken in relation to more than one communication action counterpart users, and wherein step e) comprises the first piece of software automatically creating one individual blockchain transaction on the first blockchain for each of the communication action counterpart users, each comprising a respective transaction identifier of the type.

14. The method of claim 1, wherein each of the communication actions is individually selected from the group containing sending an e-mail or other digital, electronic message using a predetermined communication protocol; digitally, electronically following or requesting a follow of a social media user; digitally, electronically sharing or posting a piece of information; and digitally, electronically inviting a user to participate in a particular digital context.

15. A system for managing digital, electronic communication, the system comprising a central server including a processor and a first piece of software associated with a first user, the central server being arranged to provide or identify a main blockchain and to provide, to the first piece of software, a first main token, the first main token being cryptographically tied to the main blockchain, the first piece of software being arranged to accept an access grant to a first user account of a first, digital communication service, the access grant being configured to allow the first piece of software to automatically and autonomously access the first user account to read communications of the first communication service without the participation of the first user, the first piece of software further being arranged to automatically read, using the access grant, an alpha communication action performed by the first user in the first communication service, and as a result automatically create an alpha blockchain transaction on a first blockchain, the first blockchain being a sub-blockchain of the main blockchain and initiated based on the first main token, the alpha blockchain transaction comprising or being associated with metadata being specific regarding the alpha communication action, the alpha blockchain transaction being defined independently of a payload associated with the alpha communication action, in that the first piece of software or the central server is further arranged to incorporate the alpha blockchain transaction in the first blockchain, the central server being arranged to read the alpha blockchain transaction and to provide priority information regarding a beta communication action, taken by a first user in the first communication service or in a second digital, electronic communication service, based on the alpha blockchain transaction, the priority information being provided further based on a total, weighted or non-weighted, number of blockchain transactions registered on at least a second blockchain and a third blockchain, that are not the same as the first blockchain, each of the at least second and third blockchains being initiated based on a respective main token that is cryptographically tied to the main blockchain.

\* \* \* \* \*